April 20, 1965   R. L. RICHARDSON   3,179,196
TRAILER HANDLING DEVICE
Filed Aug. 28, 1963   2 Sheets-Sheet 1

INVENTOR.
Robert L. Richardson
BY John A. Hamilton
Attorney.

INVENTOR.
Robert L. Richardson
BY John A. Hamilton
Attorney.

3,179,196
TRAILER HANDLING DEVICE
Robert L. Richardson, 5825 Beverly, Mission, Kans.
Filed Aug. 28, 1963, Ser. No. 305,096
9 Claims. (Cl. 180—14)

This invention relates to new and useful improvements in devices for handling or moving trailers such as house trailers, boat trailers, camping trailers and the like which are ordinarily attached to automobiles or other vehicles by standard hitch devices.

Trailers such as described above often must be moved about in congested areas such as trailer rental yards, camping grounds, boat launching areas, or the like where limited space makes it difficult or virtually impossible to maneuver an automobile into position to hitch a trailer thereto, and of course the trailer itself is quite often too heavy to be moved by manual power. Accordingly, the principal object of the present invention is the provision of a device for performing this operation easily, conveniently and economically.

The device forming the subject matter of the present invention consists of a small powered cart somewhat resembling, and no larger than, an ordinary power lawnmower, and having mounted thereon the ball portion of an ordinary ball-and-socket trailer hitch, said ball being adapted to be engaged by the socket portion of the hitch carried by the draft tongue of a trailer. Once the hitch elements are so engaged, the power unit of the cart furnishes power for pulling or pushing the trailer easily and conveniently to any desired location or position.

Another object is the provision in a device of the character described, of lift means for elevating the trailer tongue to a sufficient height to enable the hitch socket carried thereby to engage the hitch ball mounted on the cart. Particularly when a trailer is loaded, elevating the tongue by direct manual lifting may be extremely difficult if not actually impossible.

Other objects are simplicity and economy of construction, efficiency and dependability of operation, and adaptability for use in a wide variety of applications.

Figure 1:
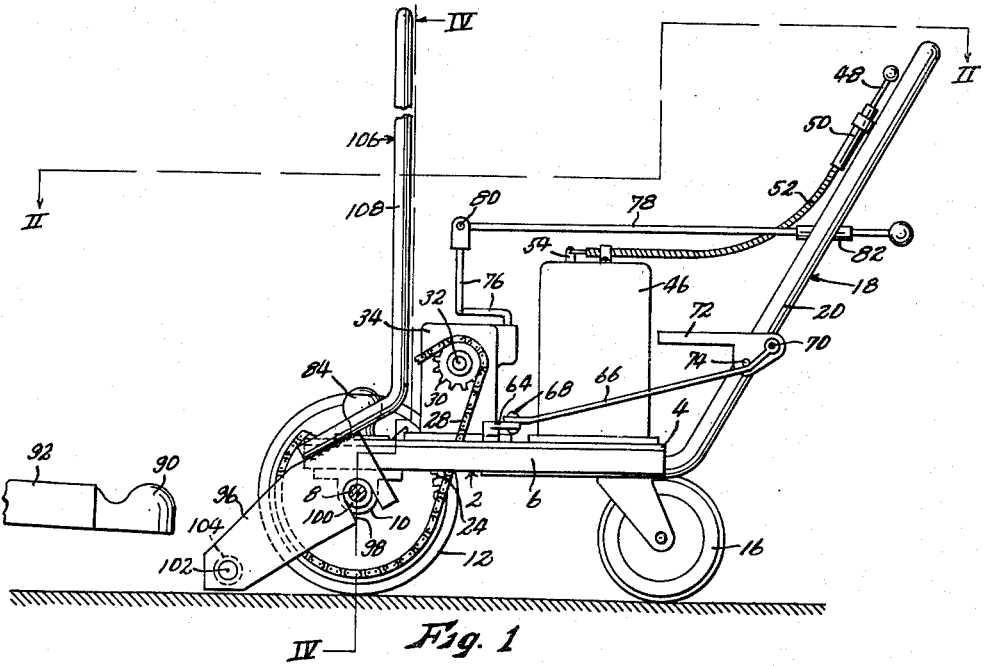
Figure 2:
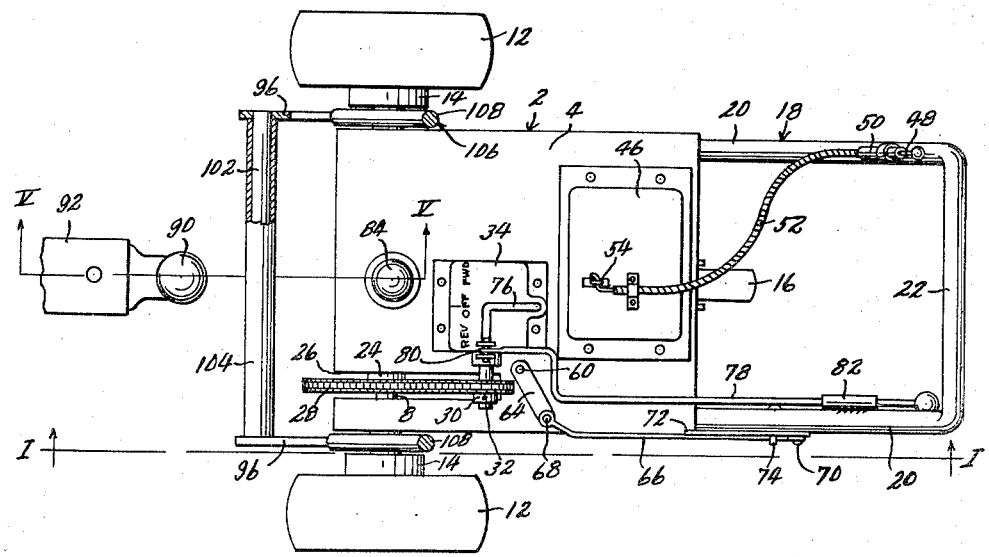
Figure 3:
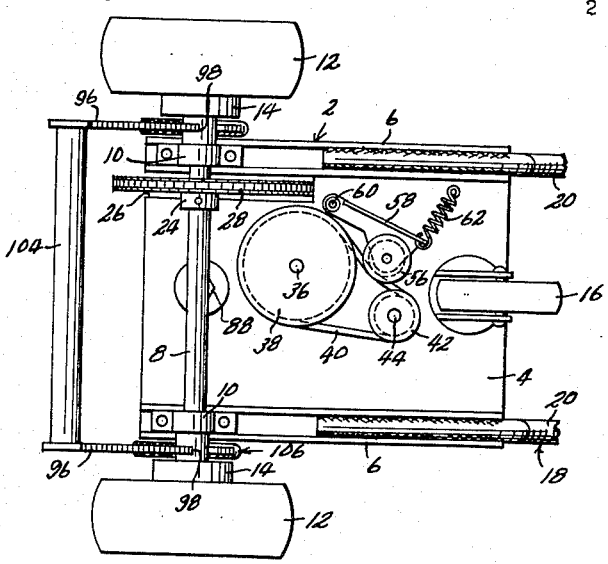
Figure 4:
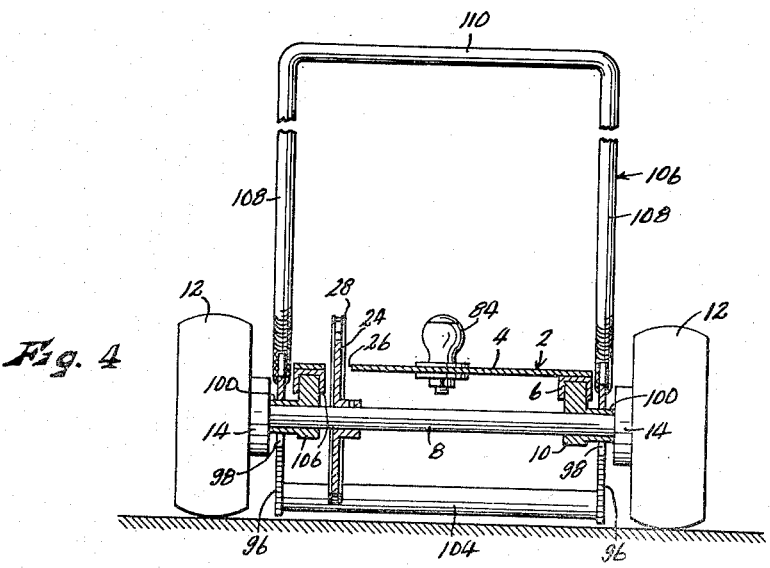
Figure 5:
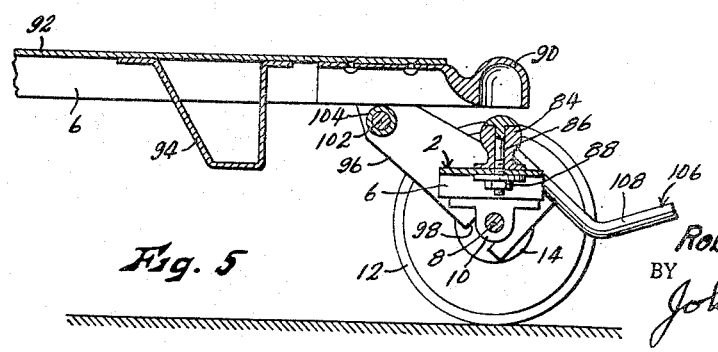

With these objects in view, as well as other objects which will appear in the course of the specification, reference will be had to the accompanying drawing, wherein:

FIG. 1 is essentially a side elevational view of a trailer handling device embodying the present invention, being a sectional view taken on line I—I of FIG. 2, with parts broken away and foreshortened, said device being shown in approaching relation to the draft tongue of a trailer, FIG. 2 is a sectional view taken on line II—II of FIG. 1, FIG. 3 is a fragmentary inverted plan view of the device, FIG. 4 is a sectional view taken on line IV—IV of FIG. 1, with parts broken away and foreshortened, and FIG. 5 is a fragmentary sectional view taken on line V—V of FIG. 2, but showing the trailer tongue elevated into position for engaging the hitch ball of the cart.

Like reference numerals apply to similar parts throughout the several views, and the numeral 2 applies generally to a wheeled cart forming a part of the device forming the subject matter of the present invention. Said cart includes a horizontal platform 4 formed of plate steel or the like and being rectangular in form. A pair of parallel channel irons 6 are affixed to the lower surface of the platform along the opposite longitudinal edges thereof. Adjacent the forward end of the platform, a horizontal shaft 8 extends transversely beneath the platform, being journalled rotatably in a pair of bearings 10 affixed respectively in channel irons 6. Mounted respectively on the ends of said shaft, in outwardly spaced relation from platform 4, are a pair of ground-engaging wheels 12. Mounted in the hub 14 of each of said wheels is a ratchet-drive mechanism by means of which the wheel may turn faster than shaft 8. This permits the cart to be steered more easily, as will presently appear. Such ratchet drives are common and well-understood in the art, and are not here detailed. The platform 2 is supported at its rearward end by a swivelled, ground-engaging caster wheel 16, also to permit steering of the cart. A U-shaped handle member 18 is formed of tubular or rod stock, having a pair of parallel side arms 20 each with its free end portion welded or otherwise fixed in one of channel irons 6, and angled upwardly behind platform 4, being connected at their upper ends by a cross bar 22 which serves as a means for guiding the cart manually.

Affixed on shaft 8 is a toothed sprocket wheel 24 which extends upwardly through a slot 26 formed in platform 4, and which is operatively connected by a sprocket chain 28 with a sprocket wheel 30 affixed on the output shaft 32 of a geared transmission unit 34 mounted on platform 4. The input shaft 36 of said transmission (see FIG. 3) extends downwardly through platform 4, and has a belt pulley 38 mounted at the lower end thereof, said pulley being connected by a normally loose belt 40 to a belt pulley 42 fixed on the output shaft 44 of a gasoline engine 46 or other prime mover mounted on the upper surface of platform 4. Drive shaft 44 of said engine is vertical and extends downwardly through platform 4. Said engine, not detailed, may be equipped with all of the usual controls, characterized by a throttle plunger 48 movable in a barrel 50 affixed to one of the side arms 20 of handle 18 and connected through a flexible cable 52 to the throttle lever 54 of the engine, so as to control the speed of the engine.

Belt 40 is normally sufficiently loose that rotation of pulley 44 will not cause said belt to turn pulley 38, and thus serves as a clutch for disconnecting the engine from shaft 8 and traction wheels 12, but may be tightened, whereby to complete the power train, by a tightener pulley 56 rotatably mounted at one end of a lever 58, said lever being affixed at its opposite end to a vertical shaft 60 journalled in platform 4. A spring 62 (see FIG. 3) normally urges tightener pulley 56 away from belt 40. Affixed to shaft 60 above platform 4 is one end of a crank arm 64. A rigid link 66 is pivoted at one end, as at 68, to the free end of crank 64, extends rearwardly therefrom, and is pivoted at its opposite end, as at 70, to a lever 72 pivoted at 74 to one side arm 20 of handle 18, pivot 74 being eccentric to pivot 70. When lever 72 is pivoted in a counterclockwise direction to the position shown in FIG. 1, it functions through link 66, crank 64, shaft 60, and lever 58 to urge tightener pulley 56 against belt 40, tightening said belt so that rotation of pulley 42 will cause rotation of pulley 38. In reaching the FIG. 1 position, lever 72 passes through a dead-center position in which the axis of pivot 70 passes through a plane containing pivot 68 and the axis of pivot 74, and slightly past said dead-center position, until link 66 engages the extended pivot-pin 74 as shown. The clutch thus locks in the engaged position, and can be disengaged only by forcibly turning lever 72 in a clockwise direction through the dead-center position.

Transmission unit 34 is preferably of a type providing a forward drive, reverse drive, and neutral, under the control of a shift lever 76 projecting therefrom and pivotally movable to any one of three positions, as indicated in FIG. 2. This lever is controlled by a rod 78 pivoted thereto at 80 and extending rearwardly therefrom, being contained slidably in a tubular guide 82 affixed to one of side arms 20 of handle 18.

Throttle plunger 48, clutch lever 72 and gear shift rod 78, together with any other engine or drive controls which may be deemed necessary or desirable, are conveniently accessible to an operator walking behind the cart and guiding it by his grasp on handle cross bar 22.

Affixed to the forward edge portion of platform 4, and extending upwardly therefrom, is a spherically rounded ball member 84, being secured thereto by a bolt 86 (see FIG. 5) and nut 88. Said ball member constitutes the ball portion of a standard ball-and-socket trailer hitch, and is adapted to be pivotally engaged by a downwardly opening socket member 90 affixed to the forward end of the draft tongue 92 of a trailer. As shown in FIG. 5, the trailer tongue is ordinarily equipped with a skid 94 of any suitable type which prevents the socket member 90 from falling to the ground. However, said skid of course cannot hold the socket at a sufficient elevation to pass over ball 84, which is ordinarily mounted on the rear bumper of an automobile or on some other towing vehicle, since the socket could then never be lowered onto the ball. The present device supports ball 84 at approximately a normal elevation above the ground. Hence the tongue must in some manner be elevated to engage socket 90 on ball 84, and this is often a difficult operation if the trailer itself is very heavy, or is heavily loaded.

The present device solves this problem by means of a lift device associated directly with cart 2. Said lift device is essentially a lever, and includes a pair of rocker plates 96 disposed respectively at opposite sides of platform 2, inside of wheels 12. Each of said plates has a notch 98 formed therein which pivotally engages an axial extension 100 of the adjacent shaft bearing 10, so that said rocker plate pivots coaxially with shaft 8. Said rocker plates extend forwardly of wheels 12, and are rigidly interconnected at their forward ends by a rod 102 which is parallel to shaft 8. A tubular roller 104 is mounted rotatably on rod 102, said roller extending between and being retained on said rod by rocker plates 96. A U-shaped handle 106 formed of rod stock has parallel side arms 108 welded respectively at their free ends to rocker plates 96, and extending upwardly therefrom, said side arms being interconnected at their upper ends by a cross bar 110. While the length of side arms 108 is foreshortened somewhat in the drawing, it will be understood that they are of sufficient height that when they are pivoted rearwardly from their upright position as shown in FIG. 1, the cross bar 110 thereof passes over cross bar 22 of handle 18, so that handle 106 may be pivoted rearwardly and downwardly to touch the ground if desired. The side arms 108 of handle 106 are of course spaced apart more widely than the side arms 20 of handle 18.

In use, the operator first advances the cart under the power of engine 46, with handle 106 tilted forwardly as shown in FIG. 1 to lower lift roller 104 below the level of hitch socket 90 of trailer tongue 92, until said roller is disposed directly beneath said socket. The cart is then halted, and the operator then grasps cross bar 110 of handle 106 and pulls it rearwardly toward handle 18, thereby elevating roller 104 until it engages socket 90 and lifts it to an elevation higher than the top of hitch ball 84. During this operation, handle 106 passes over handle 18, as previously described. The operator then again advances the cart, as for example by pushing clutch lever 72 forwardly and downwardly to connect engine 46 with wheels 12, thereby causing roller 104 to roll forwardly under tongue 92, until socket 90 is disposed directly above ball 84. The parts then have the relative positions shown in FIG. 5. The mechanical advantage provided by the length of handle 106 as compared to the distance between shaft 8 and roller 104 is sufficient to permit a man to lift the tongue of virtually any trailer in common usage. The operator then eases handle 106 forwardly, thereby lowering socket 90 into engagement with ball 84, and the hitch is complete. The trailer can then be "dollied" about as desired, the cart being sufficiently small to permit maneuvering of the trailer even in very close quarters. It will be understood that hitch socket 90 is ordinarily equipped with a latch device for engaging the lower curvature of ball 84 to secure these parts releasably against accidental disconnection. However, such latch means is not pertinent to the present invention and is not here shown. It will be noted that ball 84 is disposed slightly to the rear of shaft 8, in order to avoid forward tilting of the cart by the weight supported by said ball.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. A trailer handling device comprising:
   (a) a self-propelled powered cart,
   (b) a trailer hitch ball member affixed to said cart and projecting upwardly therefrom, and being adapted to be engaged by the downwardly opening socket member of a trailer hitch, said socket member being carried by the draft tongue of a trailer, and
   (c) a lift device carried by said cart and including a support member spaced apart horizontally from said cart whereby to be positionable beneath the tongue of a trailer by movement of said cart, said lift device being operable to move said support member vertically relative to said cart, whereby said tongue may be elevated to raise the socket member carried thereby above the elevation of said ball member.

2. A trailer handling device as recited in claim 1 wherein said cart is supported by at least three ground-engaging wheels, and wherein said ball member is disposed within the horizontal confines of the polygon defined by the points of contact of said wheels with the ground, whereby said cart cannot be overturned by any weight supported by said ball member.

3. A trailer handling device as recited in claim 1 wherein said support member comprises an axially elongated roller carried by said lift device for rotation about an axis at right angles to the line of travel of said cart.

4. A trailer handling device as recited in claim 1 wherein said lift device comprises a lever pivoted to said cart on a horizontal axis, said lever including a horizontally extending load arm carrying said support member at the outer end thereof, and an operating arm extending angularly to said load arm and adapted to be moved manually.

5. A trailer handling device as recited in claim 1 wherein said cart includes a front axle shaft having a ground-engaging wheel mounted at each end thereof, and wherein said lift device comprises:
   (a) a pair of elongated rocker plates each pivoted at one end on said shaft adjacent one of said wheels and extending forwardly of said wheels,
   (b) a horizontal rod parallel to said shaft, said rod extending between and being affixed to the forward end portions of said rocker plates,
   (c) a roller mounted axially for rotation on said rod, said rod and said roller constituting said support member, and
   (d) a handle member affixed to both of said rocker plates and extending therefrom radially to the pivotal axis thereof.

6. A trailer handling device as recited in claim 1 wherein said cart comprises:
   (a) a platform,
   (b) ground-engaging traction wheels supporting said platform,
   (c) a prime mover mounted on said platform, and
   (d) a power train interconnecting said prime mover operably with said traction wheels.

7. A trailer handling device as recited in claim 6 wherein said power train includes:
   (a) a power transmission unit reversible to drive said traction wheels selectively in either direction, and (b) manually operable means for reversing said power transmission unit.

8. A trailer handling device as recited in claim 6 wherein said power train includes:
(a) a clutch operable when disengaged to interrupt said power train, and
(b) manually operable means for selectively engaging and disengaging said clutch.

9. A trailer handling device as recited in claim 6 wherein said power train includes:
(a) a power transmission unit reversible to drive said traction wheels selectively in either direction,
(b) manually operable means for reversing said power transmission unit,
(c) a clutch operable when disengaged to interrupt said power train, and
(d) manually operable means for selectively engaging and disengaging said clutch.

References Cited by the Examiner
UNITED STATES PATENTS

| | | | |
|---|---|---|---|
| 2,491,824 | 12/49 | McKee | 280—425 |
| 2,851,179 | 9/58 | Vance | 180—19 X |
| 3,033,300 | 5/62 | Vanderbeck | 180—19 X |
| 3,094,186 | 6/63 | Lappin et al. | 180—19 |

FOREIGN PATENTS

| | | |
|---|---|---|
| 475,746 | 11/37 | Great Britain. |
| 729,646 | 5/55 | Great Britain. |

PHILIP ARNOLD, *Primary Examiner*.